(12) United States Patent
Laplanche et al.

(10) Patent No.: US 10,581,753 B2
(45) Date of Patent: *Mar. 3, 2020

(54) ON-DEMAND RESOURCE PROVISIONING

(71) Applicant: Pivotal Software, Inc., San Francisco, CA (US)

(72) Inventors: Ben Jonathan Laplanche, London (GB); Alexander David Ley, London (GB); Dmitriy Kalinin, San Francisco, CA (US); Craig Furman, London (GB); Jatin Naik, London (GB); Tom Anderson, London (GB); Maria Ntalla, Colchester (GB); James Joshua Hill, London (GB); Onsi Joe Fakhouri, Denver, CO (US); Tammer Saleh, Woodland, CA (US)

(73) Assignee: Pivotal Software, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/251,832

(22) Filed: Jan. 18, 2019

(65) Prior Publication Data

US 2019/0199651 A1   Jun. 27, 2019

Related U.S. Application Data

(63) Continuation of application No. 15/256,275, filed on Sep. 2, 2016, now Pat. No. 10,187,323.

(51) Int. Cl.
*G06F 15/173* (2006.01)
*H04L 12/927* (2013.01)
(Continued)

(52) U.S. Cl.
CPC ........ *H04L 47/803* (2013.01); *G06F 9/45558* (2013.01); *G06F 9/5072* (2013.01);
(Continued)

(58) Field of Classification Search
USPC .......................................................... 709/226
See application file for complete search history.

(56) References Cited

U.S. PATENT DOCUMENTS 8,572,635 B2 * 10/2013 Craddock ............. G06F 9/4812
719/321
10,187,323 B2    1/2019 Laplanche et al.
(Continued)

FOREIGN PATENT DOCUMENTS

WO    WO 2015/184179    12/2015

OTHER PUBLICATIONS

PCT International Preliminary Report on Patentability in International Application No. PCT/US2017/049910, dated Mar. 14, 2019, 12 pages.

(Continued)

*Primary Examiner* — Anthony Mejia
(74) *Attorney, Agent, or Firm* — Fish & Richardson P.C.

(57) ABSTRACT

Methods, systems, and computer-readable media for on-demand resource provisioning for service instances. An on-demand service broker provisions IaaS resources at service instance creating time. The service broker provides a catalog listing one or more service plans, each service plan corresponds to a set of available resources. A user device selects a respective service plan that matches specific needs of an application that consumes the resources. The service broker generates a deployment manifest based on the selected service plan. The service broker then submits the deployment manifest to a deployment system. The deployment system provisions the resources to the service instance according to the manifest generated by the service broker.

20 Claims, 10 Drawing Sheets

(51) Int. Cl.
*G06F 9/50* (2006.01)
*G06F 9/455* (2018.01)

(52) U.S. Cl.
CPC .... *G06F 9/5077* (2013.01); *G06F 2009/4557* (2013.01); *G06F 2009/45595* (2013.01)

(56) References Cited

U.S. PATENT DOCUMENTS

| | | |
|---|---|---|
| 2012/0204187 A1 | 8/2012 | Breiter et al. |
| 2013/0219060 A1* | 8/2013 | Sturgeon ................. G06F 1/206 709/224 |
| 2013/0232463 A1 | 9/2013 | Nagaraja et al. |
| 2013/0238795 A1* | 9/2013 | Geffin ..................... G06F 1/206 709/224 |
| 2014/0280918 A1 | 9/2014 | Grandhe |
| 2014/0280964 A1 | 9/2014 | Farooq |
| 2014/0280966 A1 | 9/2014 | Sapuram |
| 2014/0282037 A1 | 9/2014 | Narasimhan |
| 2014/0282525 A1 | 9/2014 | Sapuram et al. |
| 2014/0282536 A1 | 9/2014 | Dave |
| 2014/0317166 A1 | 10/2014 | Iyoob |
| 2014/0324647 A1 | 10/2014 | Iyoob |
| 2014/0365662 A1 | 12/2014 | Dave |
| 2015/0026349 A1 | 1/2015 | Iyoob |
| 2015/0156065 A1 | 6/2015 | Grandhe |
| 2015/0188927 A1 | 7/2015 | Santhi |
| 2015/0378708 A1 | 12/2015 | Nagaraja et al. |
| 2015/0381435 A1* | 12/2015 | Todd ....................... H04L 67/10 709/223 |
| 2016/0019636 A1 | 1/2016 | Adapalli |
| 2017/0364549 A1* | 12/2017 | Abalos ................ G06Q 30/016 |

OTHER PUBLICATIONS

International Search Report and Written Opinion in International Application No. PCT/US2017/049910, dated Nov. 27, 2017, 18 pages.

* cited by examiner

ON-DEMAND RESOURCE PROVISIONING

CROSS-REFERENCE TO RELATED APPLICATION

This is a continuation of U.S. application Ser. No. 15/256,275, filed on Sep. 2, 2016, the disclosure of which is considered part of and is incorporated by reference in the disclosure of this application.

BACKGROUND

This specification generally relates to cloud computing techniques.

In cloud computing, a set of shared computing resources, storage resources, and network resources can be provisioned to users, generally in the form of virtual machines. Multiple physical computing appliances, e.g., computers in a server farm, can provide a service platform for provisioning these resources. The service platform is sometimes referred to as infrastructure as a service (IaaS). A set of services can enable software developers to develop, launch, and manage application programs, generally referred to simply as applications, without interacting directly with the appliances of the IaaS. An example service platform is VMware vSphere™ cloud platform software installed on a rack of Intel™ processor-based physical servers to manage these physical servers as a set of shared cloud resources.

A deployment system can automate and simplify transforming a source code or binary code representation of an application into a service instance of that application using IaaS resources. The service instance can then be accessed by end users on a cloud computing platform. An example of a cloud computing platform is a Pivotal Cloud Foundry® software product deployed on a set of vSphere-based cloud appliances.

SUMMARY

This specification describes methods, systems, and computer-readable media for on-demand resource provisioning for service instances. An on-demand service broker provisions IaaS resources at service instance creating time. The on-demand service broker provides a catalog listing one or more service plans, each service plan corresponding to a set of available resources. A user device selects a respective service plan that matches specific needs of each service instance. The on-demand service broker generates a deployment manifest based on the selected set of service plan. The on-demand service broker then submits the deployment manifest to a deployment system. The deployment system provisions the resources to the service instance according to the manifest generated by the on-demand service broker.

Particular embodiments of the subject matter described in this specification can be implemented to realize one or more of the following advantages. Compared to conventional techniques for provisioning resources, the techniques described in this specification provide more flexible resource provisioning. The resource provisioning occurs at service instance creation time, as opposed to pre-provisioning a fixed quantity of resources at broker deployment time. Accordingly, the techniques disclosed can scale resource consumption proportional to need, without requiring planning ahead for pre-provisioning. The techniques disclosed allow application developers to control resource provisioning and usage, thereby providing more flexibility compared to conventional techniques that require application developers to acquire resources through an operator. An on-demand service broker reduces the amount of code service developers have to write by abstracting away functionality common to most on-demand service brokers, e.g., single-tenant on-demand service brokers. An on-demand service broker can use an application programming interface (API) to access various deployment systems, e.g., BOSH, to deploy service instances. Accordingly, the techniques can integrate variations of applications with a marketplace of IaaS resources as long as the variations are deployable by that deployment system.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTIONS OF DRAWINGS

Like reference numbers and designations in the various drawings indicate like elements.

DETAILED DESCRIPTION

Figure 1:
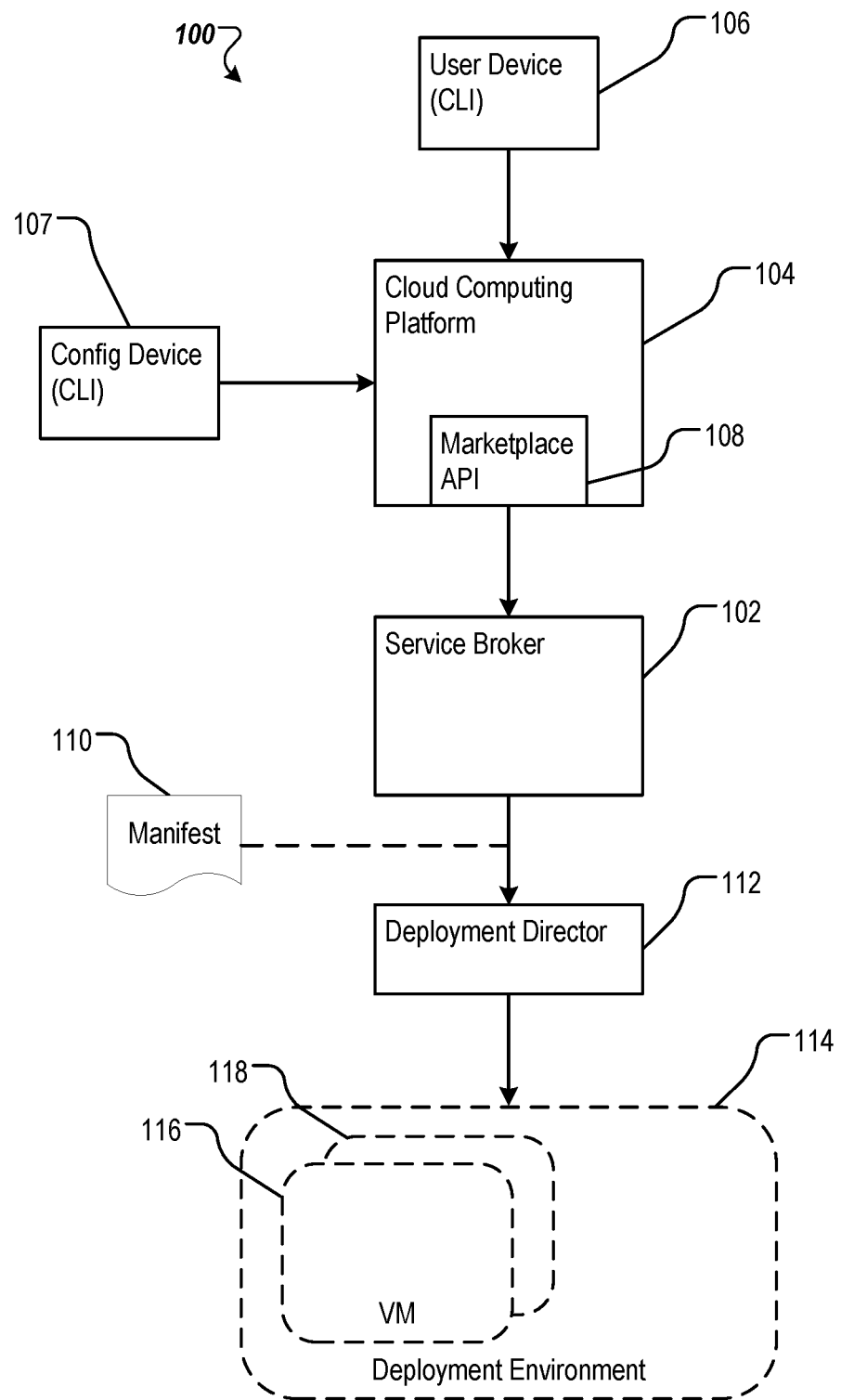
FIG. 1 is a block diagram illustrating an architecture of an example system implementing on-demand resource provisioning.

FIG. 1 is a block diagram illustrating an architecture of an example system 100 implementing on-demand resource provisioning. The system 100 is implemented on one or more computers. The system 100 includes a service broker 102, which is an on-demand service broker. The service broker 102 allows application developers to provision services to be used by one or more service instances on a cloud computing platform 104. The service broker 102 can be implemented as one or more computers configured as Hypertext Transfer Protocol (HTTP) servers that conforms to a service broker API. The service broker 102 is registered with a cloud controller of the cloud computing platform 104. The cloud controller is a component of the cloud computing platform that provides endpoints for a client and maintains a database of organizations, spaces, services, user roles, etc. The endpoints can include one or more user devices, e.g., a user device 106, configured to access the cloud computing platform 104. The service broker 102 provisions IaaS resources at service instance creation time.

The cloud computing platform 104 provides a marketplace API that allows applications to view and select resources of the cloud computing platform 104. The resources can include, for example, databases on a shared or dedicated server, on accounts on an IaaS application. A service instance includes an application, a configured environment in which the application executes, e.g., one or more virtual machines, and a bundle of resources provisioned to the application and configured environment. In this specification, a service instance is also referred to as a deployment of the application program. The resources can include, for example, processors, storage devices, networks, databases, libraries, among other hardware and software of the cloud computing platform 104.

The user device 106 is a device providing an interface to an application developer. The interface can be a command-line interface (CLI), graphical user interface (GUI), or various combinations of the two. The user device 106 can issue a request to provision resources for an application during creation of a service instance for the application. The cloud computing platform 104 communicates with the service broker 102 and informs the service broker 102 of the request. The service broker 102 provides a catalog of service plans to the cloud computing platform 104 through a marketplace API 108. The marketplace API 108 exposes a specification for accessing a services marketplace, where aggregated catalogs of services and plans are exposed to various devices.

The service broker 102 registers the catalog of service plans with a cloud controller of the cloud computing platform 104. Responsive to a request from an operator of the cloud computing platform 104, the cloud controller enables access of the user device 106 to the service plans based on a hierarchical access privilege scheme, e.g., based on organizations or spaces. The user device 106 issues a listing request, e.g., "cloud market place" to access the service plans. Upon receiving the listing request, the cloud controller provides a list of service plans as provided in the catalog.

The user device 106 selects a service plan. In response to the selection, the cloud controller of the cloud computing platform 104 submits instructions to the service broker 102 to create a service instance through a service broker API. In response to the instructions, the service broker 102 generates a deployment manifest 110 that specifies attributes of resources listed in the selected plan. The service broker 102 then deploys the deployment manifest 110 by providing the deployment manifest 110 to a deployment director 112, e.g., a BOSH director, for provisioning the resources. The deployment director 112 deploys the application in a deployment environment 114. The deployment environment 114 can include one or more computers, networks and other hardware or software components. Deploying the application can include creating virtual machines 116 and 118. Each of virtual machines 116 and 118 can be designated as at least a part of a service instance of that application.

A configuration device 107 provides an interface for configuring an operating environment for the service broker 102. Like the user device 106, the configuration device 107 provides a GUI or CLI. The CLI of the configuration device 107 is configured to receive instructions for deploying the service broker 102 and uploads dependencies of the service broker 102. In some implementations, configuring the operating environment include the following operations. The configuration device 107 designates a target for a service broker 102. The target is a reference, e.g., a URI and port number, for accessing the deployment director 112. The configuration device 107 then clones software portion of the service broker 102 and uploads the software portion of the service broker 102. The configuration device 107 then creates a service broker manifest for the deployment director 112. The service broker manifest, also referred to simply as a broker manifest, specifies the attributes of the service broker 102. Details of the service broker manifest are described below in reference to FIG. 2.

Figure 2:
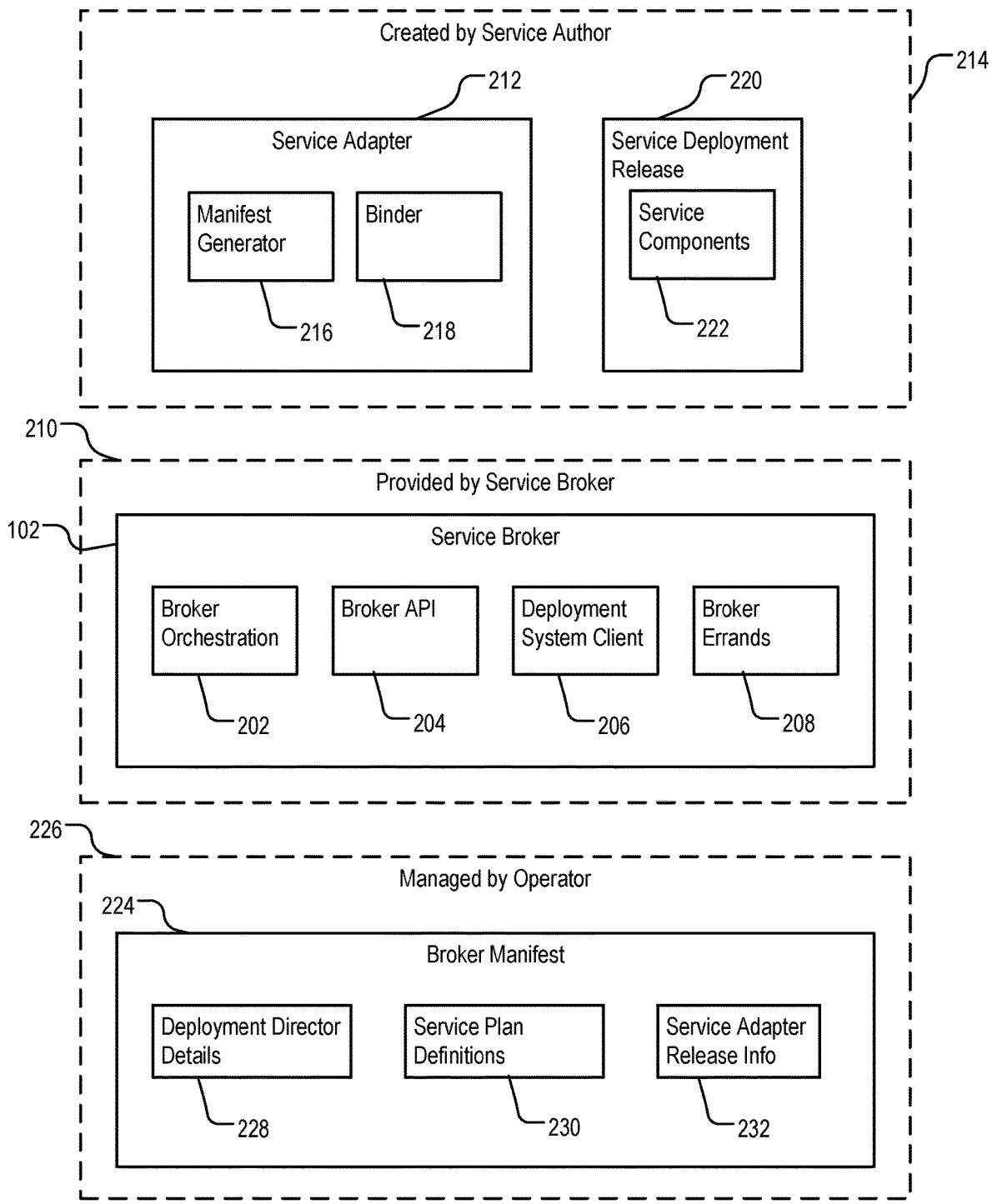
FIG. 2 is a block diagram illustrating functional modules of an example system implementing on-demand resource provisioning.

FIG. 2 is a diagram illustrating functional modules of an example system implementing on-demand resource provisioning. The system includes a service broker 102. The service broker 102 includes a broker orchestration module 202. The broker orchestration module 202 is a functional module of the service broker 102 configured to organize communications with other components of the system, including receiving requests and submitting results.

The service broker 102 includes a broker API 204. The broker API 204 can specify interfaces between the service broker 102 and other components of the system, including, for example, formats of calls, parameter of the calls, formats of manifest files, etc. The service broker 102 includes a deployment system client 206. The deployment system client 206 is a functional module of the service broker 102 configured to liaison between the service broker 102 and a deployment system, e.g., a BOSH system. For example, the deployment system client 206 can manage communication and messaging between the between the service broker 102 and the deployment system. The service broker 102 can include a broker errands module 208. The broker errands module 208 is configured to manage one or more broker errands, including, for example, processes for registering the service broker 102, for de-registering the service broker 102, for updating one or more service instances, or for deleting one or more instances. A scope 210 of responsibilities of the service broker 102 includes the functions and operations provided by the broker orchestration module 202, the broker API 204, the deployment system client 206, and the broker errands module 208.

The service broker 102 can generate, or cause to be generated, one or more deployment manifests. Each deployment manifest specifies one or more resources for a deployment. In some implementations, the service broker 102 generates a deployment manifest by delegating the generation to a service adapter 212. The service adapter 212 can be an executable, e.g., a binary or a script, that is configured to be invoked by the service broker 102 to execute on one or more computers. The service adapter 212 performs various service-specific tasks. A service author responsible for building a cloud-based product is responsible for the functionalities of the service adapter 212. A scope 214 of the responsibility of the service author includes maintaining the service adapter 212 and the service deployment release 220.

In the example shown, the service adapter 212 performs various functions. In various implementations, the functions of the service adapter 212 can be incorporated into the service broker 102, or be replaced by other functional modules of the system.

The service adapter 212 includes a manifest generator 216 and a binder 218. The manifest generator 216 is a functional module of the service adapter 212 configured to generate a deployment manifest based on a selected plan. The binder 218 is functional module of the service adapter 212 configured to bind or unbind resources to a deployment. Binding resources to the deployment can include providing references and credentials for accessing the resources, e.g., addresses and ports of databases, database names, user names and passwords, to a resource consumer, e.g., an application or a virtual machine for executing an application. Additional details of binding and unbinding are described below in reference to FIG. 7. The service author is also responsible for configuring a service deployment release 220. The service deployment release 220 can include various service components 222 for deployment.

An operator of the cloud computing platform creates and maintains a broker manifest 224. The broker manifest 224 defines features of the service broker 102. A scope 226 of responsibilities of the operator incudes managing the broker manifest 224. The broker manifest 224 includes deployment director details 228, service plan definitions 230, and service adapter release information 232. Portions of an example broker manifest 224 are shown in Listing 1 below.

Listing 1 - Example Service Broker Manifest

```
instance_groups:
  -   name: <broker name>
      instances: 1
      jobs:
          - name: <job name>
            release: on-demand-service-broker
            properties:
                port: <broker port>
                username: <broker username>
                password: <broker password>
                cloud computing platform:
                    url: <cloud computing platform URL>
                    root_ca_cert: <certificate for cloud controller>
                deployment system:
                    url: <deployment director URL>
                    root_ca_cert: <certificate for deployment system>
                    authentication: <authentication content>
                service_adapter:
                    path: <path to service adapter binary>
      vm_type: <vm type>
      networks:
        - name: <network>
```

In Listing 1, the "instance_groups" field includes multiple sections and indicates an instance group the broker manifest 224 is directed to. The "name" field of the instance group corresponds to a parameter that indicates a name of the service broker. The "jobs" field indicates a chunk of work the service broker 102 performs. The "name" tag of in the "jobs" section corresponds to a parameter of the chunk of work. The "release" tag corresponds to a release name of the service broker. The "properties" tag corresponds to properties of the service broker. The properties can include a port number and authentication credentials for accessing the service broker. The properties can include parameters for accessing a cloud computing platform. An example cloud computing platform is CloudFoundry™. The parameters can include a reference, e.g., a URL, to the cloud computing platform and a certificate to access the cloud computing platform. The properties can include deployment director details 228. The deployment director details 228 include parameters for accessing a deployment system, e.g., a BOSH system. The parameters can include a reference, e.g., a URL to the deployment director of the deployment system. The parameters can include credentials, e.g., a user name and password, or a certificate, for accessing the deployment system. The properties can include a "vm_type" tag for specifying a virtual machine type, and a "network" tag for specifying a network of the instance group.

The properties can include service adapter release information 232. The service adapter release information 232 can be a section marked by a tag, e.g., "service_adapter." The service adapter release information 232 can include parameters, e.g., a path, port, and release name, for specifying service adapter 212.

The broker manifest 223 includes service plan definitions 230. The service plan definitions 230 can include a catalog listing one or more service plans. A service plan specifies a set of resources, including, for example, resource type or resource amount, for a service instance. At deployment time, a developer need not specify particular resources. The developer can select a service plan. The service broker then automatically generates deployment manifests based on the selected service plan. An example catalog section of a broker manifest 224 is provided below in Listing 2.

Listing 2 - Example Catalog Broker Manifest

```
- name: broker
  instances: 1
  jobs:
    - name: broker
      release: *broker-release
      properties:
          ...
          service_deployment:
              releases:
              ...
          service_catalog:
              id: <service catalog identifier>
              service_name: <a name>
              service_description: <a description>
              bindable: <true | false>
              plan_updatable: <true | false>
              tags: <a tag>
              plans:
                - name: <a first plan name>
                  plan_id: <a plan identifier>
                  description: A deployment with one instance of each job
                               and disk
                  instance_groups:
                    - name: <instance group name >
                      vm_type: container
                      instances: 1
                      persistent_disk: <a number>
                      networks: <network name>
                    - name: <instance group name 2>
                      vm_type: container
                  properties:
                      auto_create_topics: true
                      default_replication_factor: 1
```

In the service broker manifest, a section can have a tag indicating a catalog. In this example, the tag is "service_catalog." The section can have field, e.g., "id," for indicating a catalog identifier. The section can have a "service_name" field for specifying a service name, a "service_description" field for specifying s service description, a "bindable" field for specifying whether the service can be bound, and a "plan_updatable" field for specifying whether the plan can be updated. The section can have a "plans" subsection for listing one or more one or more plans for provisioning resources. The subsection can specify plan names, e.g., "small," "medium" or "large," for provisioning resources. For each plan, the broker manifest 224 can specify a virtual machine type, a number of instances, a number of disks for persistence, among of other resources. When a deployment platform creates and configures the service broker, the service broker can respond to various requests for provisioning resources for deploying an application.

Figure 3:
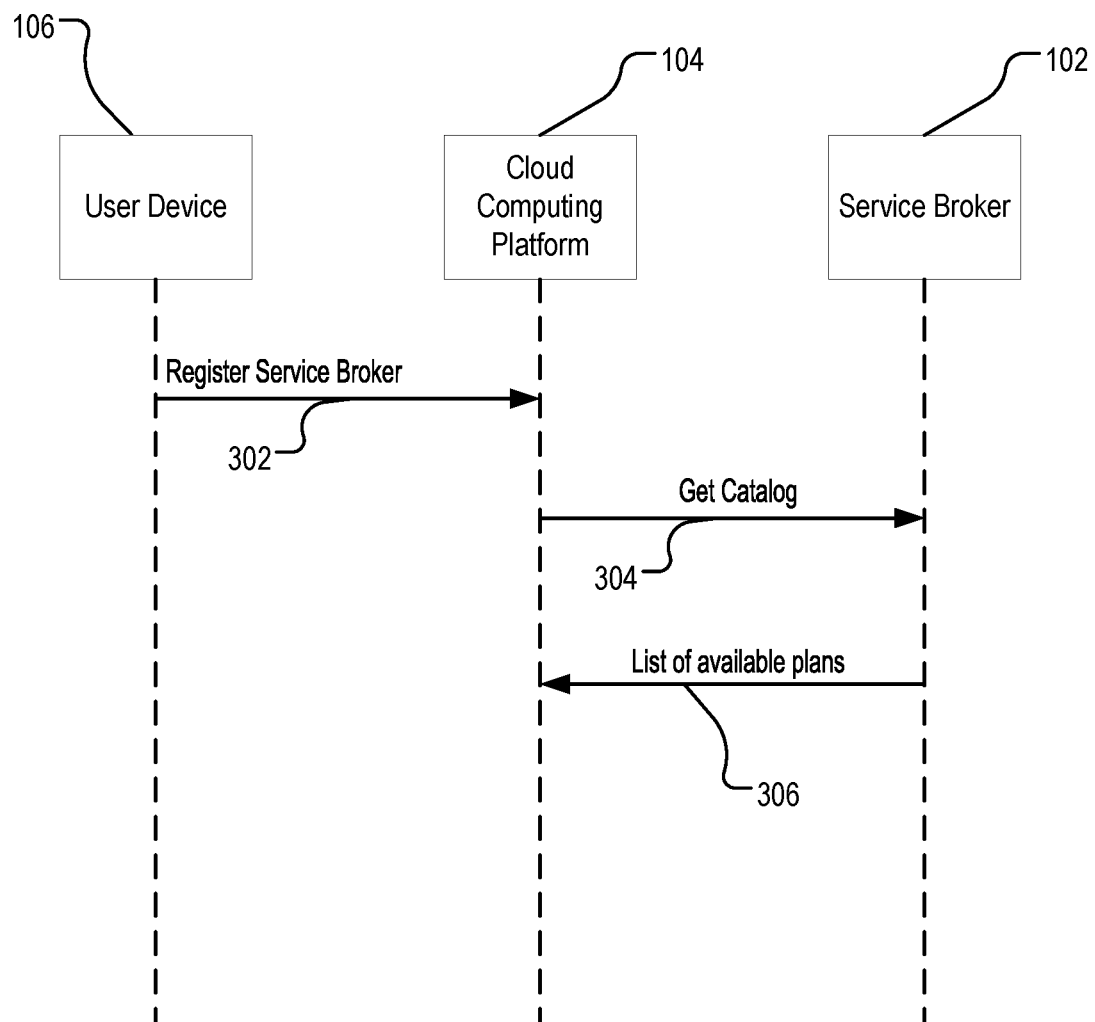
FIG. 3 is sequence diagram illustrating example operations of registering a service broker.

FIG. 3 is sequence diagram illustrating example operations of registering a service broker. A user device 106 submits a request 302 to a cloud computing platform 104. The request 302 can include, reference, or otherwise be associated with a service broker. For example, the request 302 can include a link, e.g., a URI to a service broker 102, and user name and password for accessing the service broker 102 at the link destination. The service broker can be configured by a broker manifest, e.g., the broker manifest 224 of FIG. 2. The cloud computing platform 104 receives the request 302. The cloud computing platform 104 accesses the service broker 102.

After registering the service broker 102, the cloud computing platform 104 can deploy various applications using the service broker 102. The cloud computing platform 104 issues a request 304 for catalog. In response to the request 304 for catalog, the service broker 102 provides response 306 to the cloud computing platform 104. The response can include a list of available plans. The cloud computing platform 104 selects a plan. The cloud computing platform 104 then requests the service broker 102 to create a service instance using resources of the selected plan.

Figure 4:
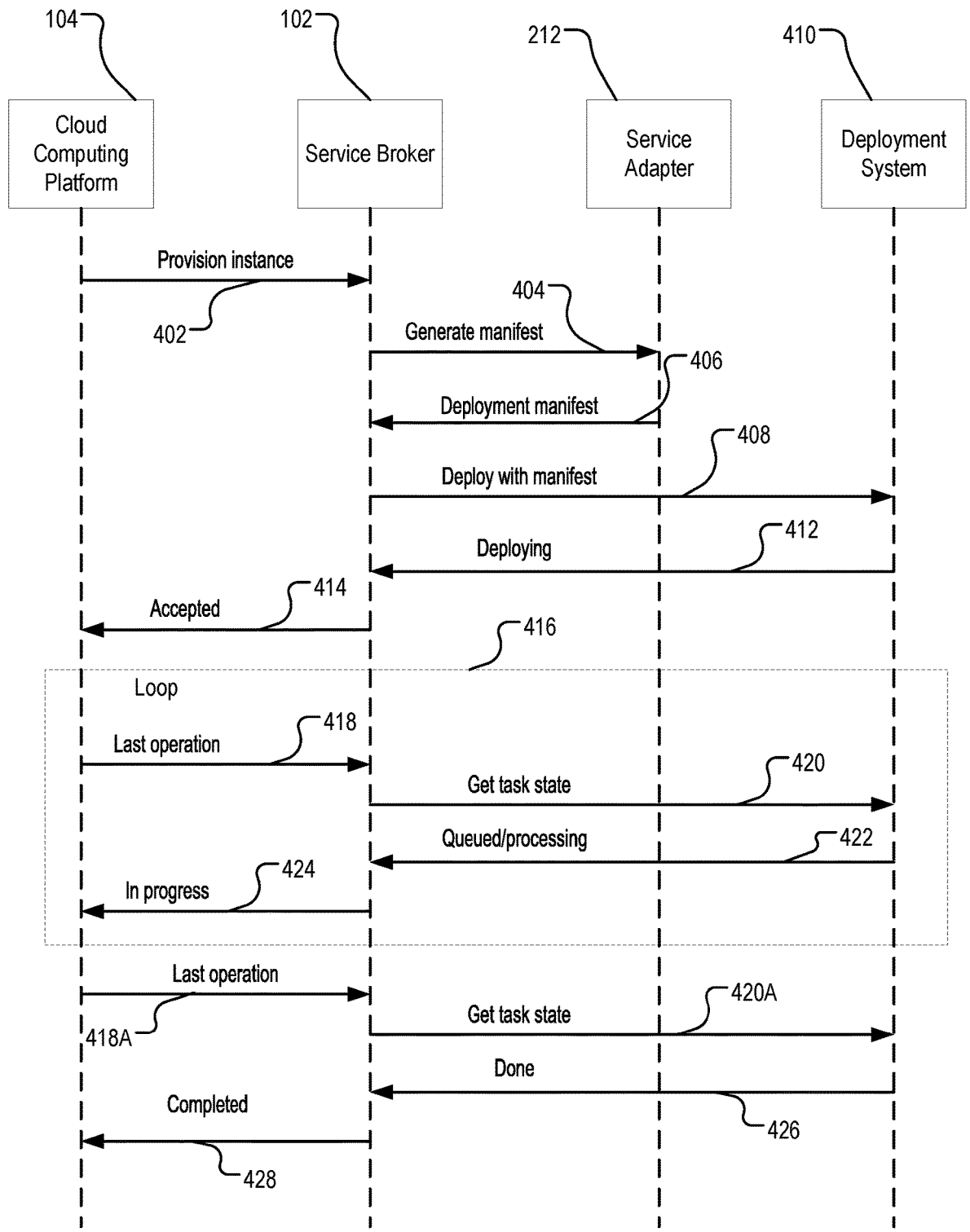
FIG. 4 is sequence diagram illustrating example operations of creating a service instance.

FIG. 4 is sequence diagram illustrating example operations of creating a service instance. Creating the service instance can be triggered by a create service request from a user device, e.g., user device 106 of FIG. 1. Upon receiving the create service request, a cloud computing platform 104 handles the request.

The cloud computing platform 104 submits a provision instance request 402 to a service broker 102. The provision instance request 402 can include, reference, or otherwise be associated with a selected service plan. The provision instance request 402 requests the service broker 102 to provision one or more resources for the service instance according to the selected plan. In response to the provision instance request 402, the service broker 102 generates a deployment manifest for provisioning the resources. In the example shown, the service broker 102 generates the deployment manifest by submitting a generate manifest request 404 to a service adapter 212. The generate manifest request 404 can include, or be associated with, the selected plan.

In response, the service adapter 212 generates a deployment manifest 406 according to the selected plan. The deployment manifest 406 can include references, amount and types of resources as specified in the selected plan. The service adapter 212 provides the deployment manifest 406 to the service broker 102. Upon receiving the deployment manifest 406, the service broker 102 can issue a deployment request 408 to a deployment system 410. The deployment system 410 can include a deployment director, e.g., the deployment director 112 of FIG. 1. The deployment director can deploy the service instance, and submits a notice 412 to the service broker 102. The service broker 102 can determine whether to accept the deployment. Upon accepting the deployment, the service broker 102 submits a notification 414 to the cloud computing platform 104 indicating that the deployment is accepted.

Upon receiving the notification 414, the cloud computing platform 104 enters a loop 416 for checking status of the task of creating a service instance. In each iteration of the loop 416, the cloud computing platform 104 submits an inquiry 418 for a last operation. In response to the inquiry 418, the service broker submits a get task state request 420 to the deployment system 410. If the task state is being queued or being in progress, the deployment system 410 returns a status 422 to the service broker 102 indicating as such. The service broker 102, in turn, submits status 424 to the cloud computing platform 104, indicating that the task is queued or in progress. The loop 416 continues until, upon a particular inquiry 418A, a corresponding get task state request 420A retrieved a status 426, indicating that the task state is done. The service broker 102 can submit status 428 to the cloud computing platform 104, indicating that the task of creating a service instance is completed.

Figure 5:
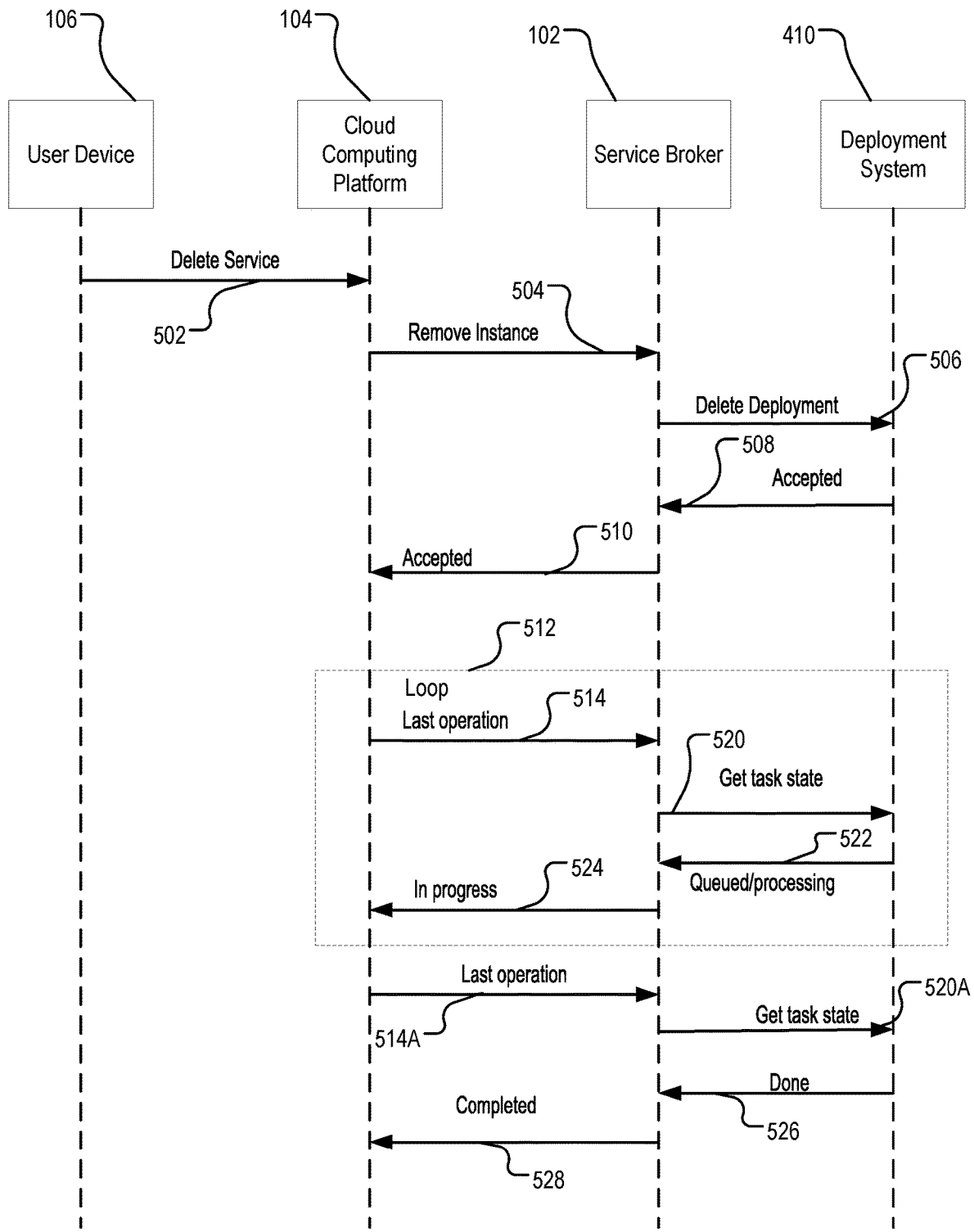
FIG. 5 is sequence diagram illustrating example operations of deleting a service instance.

FIG. 5 is sequence diagram illustrating example operations of deleting a service instance. A user device 106 submits a delete service request 502 to a cloud computing platform 104. Upon receiving the delete service request 502, the cloud computing platform 104 issues a remove service instance request 504 to a service broker 102. The service broker 102, in turn, submits a delete deployment request 506 to a deployment system 410. The deployment system 410 then provides an acknowledgement 508 to the service broker 102. The acknowledgement 508 indicates that the deployment system 410 has accepted the delete deployment request 506. The service broker then submits a notification 510 to the cloud computing platform 104. The notification 510 can indicate that the deployment system 410 is handling the remove service instance request 504.

The cloud computing platform 104 then enters a loop 512, where the cloud computing platform 104 submits an inquiry 514 for a last operation. In response to the inquiry 514, the service broker 102 submits a get task state request 520 to the deployment system 410. If the task state is being queued or being in progress, the deployment system 410 returns a status 522 to the service broker 102 indicating as such. The service broker 102, in turn, submits status 524 to the cloud computing platform 104, indicating that the task is in progress. The loop 512 continues until, upon a particular inquiry 514A, a corresponding get task state request 520A retrieved a status 526, indicating that the task state is done. The service broker 102 can submit status 528 to the cloud computing platform 104, indicating that the task of deleting the service instance is completed.

Figure 6:
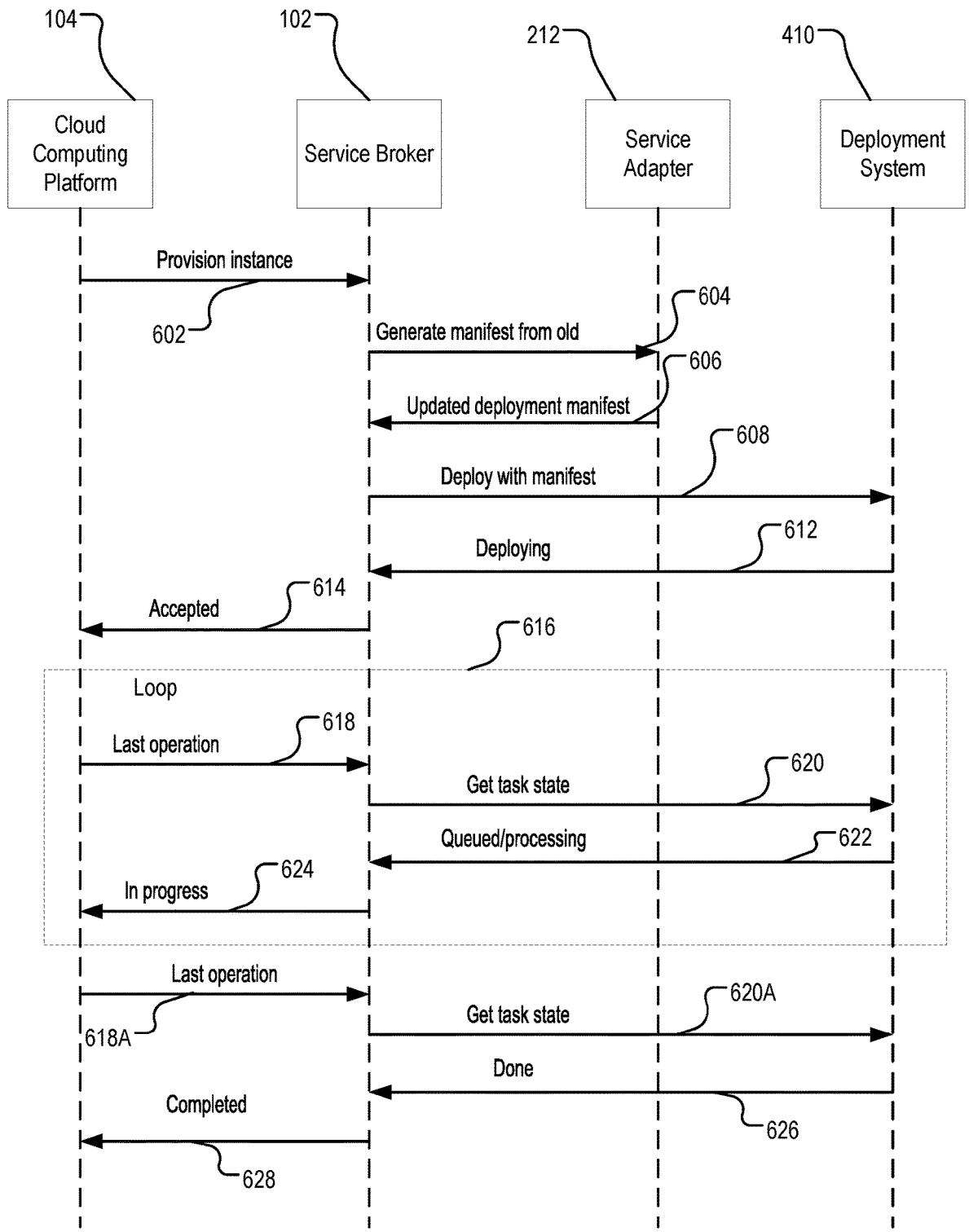
FIG. 6 is sequence diagram illustrating example operations of updating a service instance.

FIG. 6 is sequence diagram illustrating example operations of updating a service instance. Updating a service instance can include re-provisioning resources of the service instance. A user device, e.g., the user device 106 of FIG. 1, submits an update service request to a cloud computing platform 104. Upon receiving the update service request, the cloud computing platform 104 handles the request.

The cloud computing platform 104 submits a provision instance request 602 to a service broker 102. The provision instance request 602 can include, or be associated with, a previous deployment manifest that describes a previous, e.g., current provisioning of resources. The provision instance request 602 requests the service broker 102 to provision one or more resources for the service instance according to the previous deployment manifest. In response to the provision instance request 602, the service broker 102 generates an updated deployment manifest for provisioning the resources. In the example shown, the service broker 102 generates the updated deployment manifest by submitting a generate manifest from previous manifest request 604 to a service adapter 212. In some implementations, the generate manifest from previous manifest request 604 can include, reference, or otherwise be associated with a previously selected service plan. In some implementations, the generate manifest from previous manifest request 604 can include, reference, or otherwise be associated with the previous deployment manifest.

In response, the service adapter 212 generates an updated deployment manifest 606 according to the previously selected plan, or according to the previous deployment manifest. For example, the previously selected plan can be a "medium" service plan, which provisioned X amount of resources in the previous deployment manifest. The "medium" service plan has been modified to provision Y amount of resources. The service adapter 212 then generates the updated deployment manifest 606 that provisions Y amount of resources.

The updated deployment manifest 606 can include references, amount and types of resources according to the previous deployment manifest, wherein the amount and types can be the same as in the previous deployment manifest, the references can be different. The service adapter 212 provides the updated deployment manifest 606 to the service broker 102. Upon receiving the updated deployment manifest 606, the service broker 102 can issue a deployment request 608 to a deployment system 410. The deployment system 410 can include a deployment director, e.g., the deployment director 112 of FIG. 1. The deployment director can re-deploy the service instance, including provisioning the Y amount of resources to the service instance. The deployment director submits a notice 612 to the service broker 102. The service broker 102 can determine whether to accept the deployment. Upon accepting the deployment, the service broker 102 can submit a notification 614 to the cloud computing platform 104 indicating that the deployment is accepted.

Upon receiving the notification 614, the cloud computing platform 104 enters a loop 616 for checking states of the re-deployment. In each iteration of the loop 616, the cloud computing platform 104 submits an inquiry 618 for a last operation. In response to the inquiry 618, the service broker 102 submits a get task state request 620 to the deployment system 410. If the task state is being queued or being in progress, the deployment system 410 returns a status 622 to the service broker 102 indicating as such. The service broker 102, in turn, submits status 624 to the cloud computing platform 104, indicating that the task is in progress. The loop 616 continues until, upon a particular inquiry 618A, a corresponding get task state request 620A retrieved a status 626, indicating that the task state is done. The service broker 102 can submit status 628 to the cloud computing platform 104, indicating that the task of creating a service instance is completed.

Figure 7:
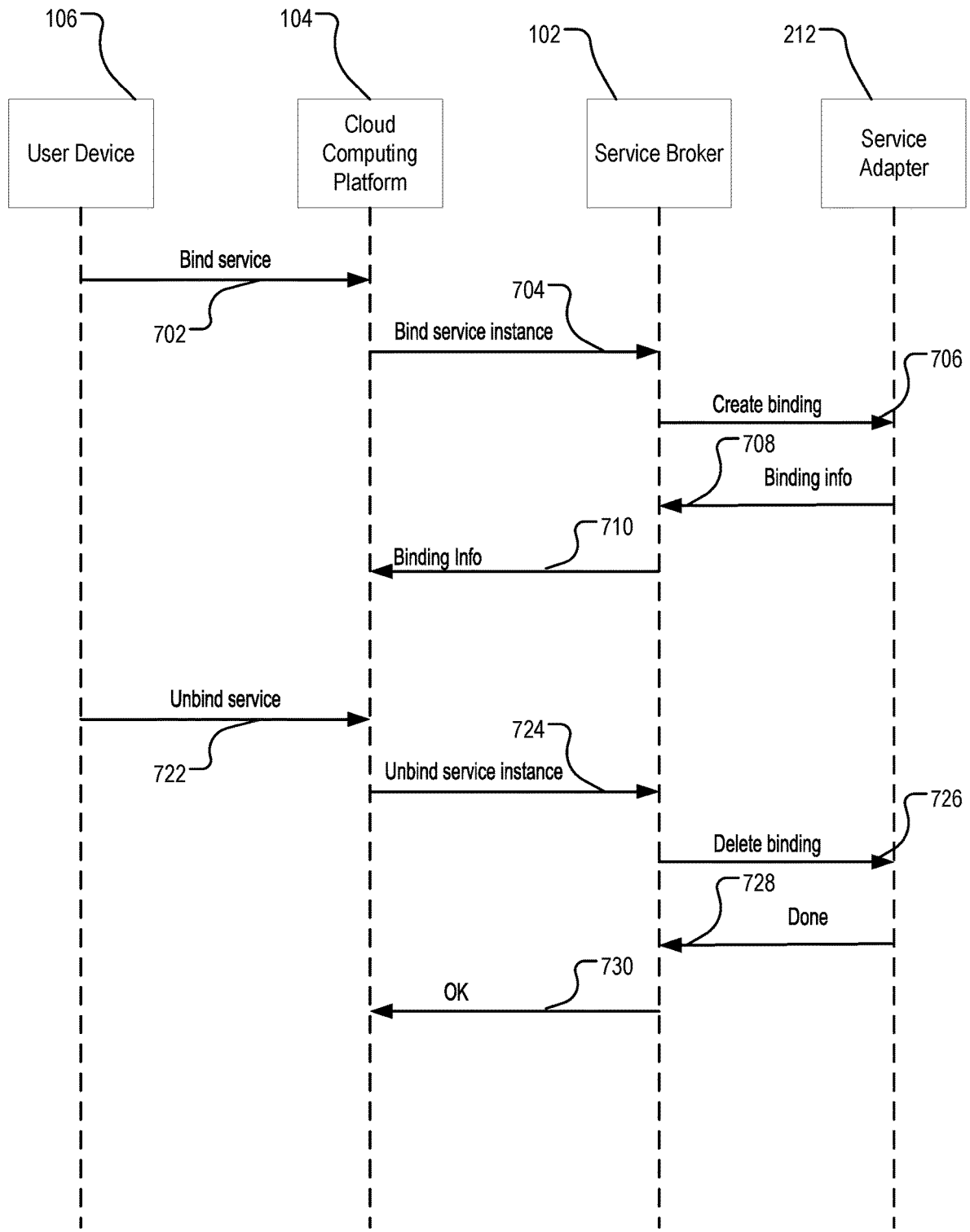
FIG. 7 is sequence diagram illustrating example operations of binding and unbinding a service instance.

FIG. 7 is sequence diagram illustrating example operations of binding and unbinding a service instance. In service binding, services, e.g., Postgres or Mongo, are bound to an application, where information about the services, e.g., host, port, and credentials, are exposed through environment variables to the application. Values of the environment variables can be encoded, e.g., in a JavaScript Object Notation (JSON) format. A user device 106 submits a bind service request 702 to a cloud computing platform 104.

Upon receiving the bind service request 702, the cloud computing platform 104 submits a bind service instance request 704 to a service broker 102. The service broker 102, in turn, submits a create binding request 706 to a service adapter 212. The service adapter 212 then obtains binding information 708, e.g., by creating the binding information 708. The service adapter 212 provides the binding information 708 to the service broker 102. The binding information 708 can include the information about the services as described above. The service broker 102 then provides the binding information 710 to the cloud computing platform 104.

At any time after the services are bound, the user device 106 can submit an unbind service request 722 to the cloud computing platform for unbinding the services. Upon receiving the unbind service request 722, the cloud computing platform 104 submits an unbind service instance request 724 to a service broker 102. The service broker 102, in turn, submits a delete binding request 726 to a service adapter 212. The service adapter 212 then deletes the binding, and provides a status 728 to the service broker 102. The status 728 can indicate that the services are unbound. The service broker 102 then provides a notification 730 to the cloud computing platform 104, indicating the services are unbound.

Figure 8:
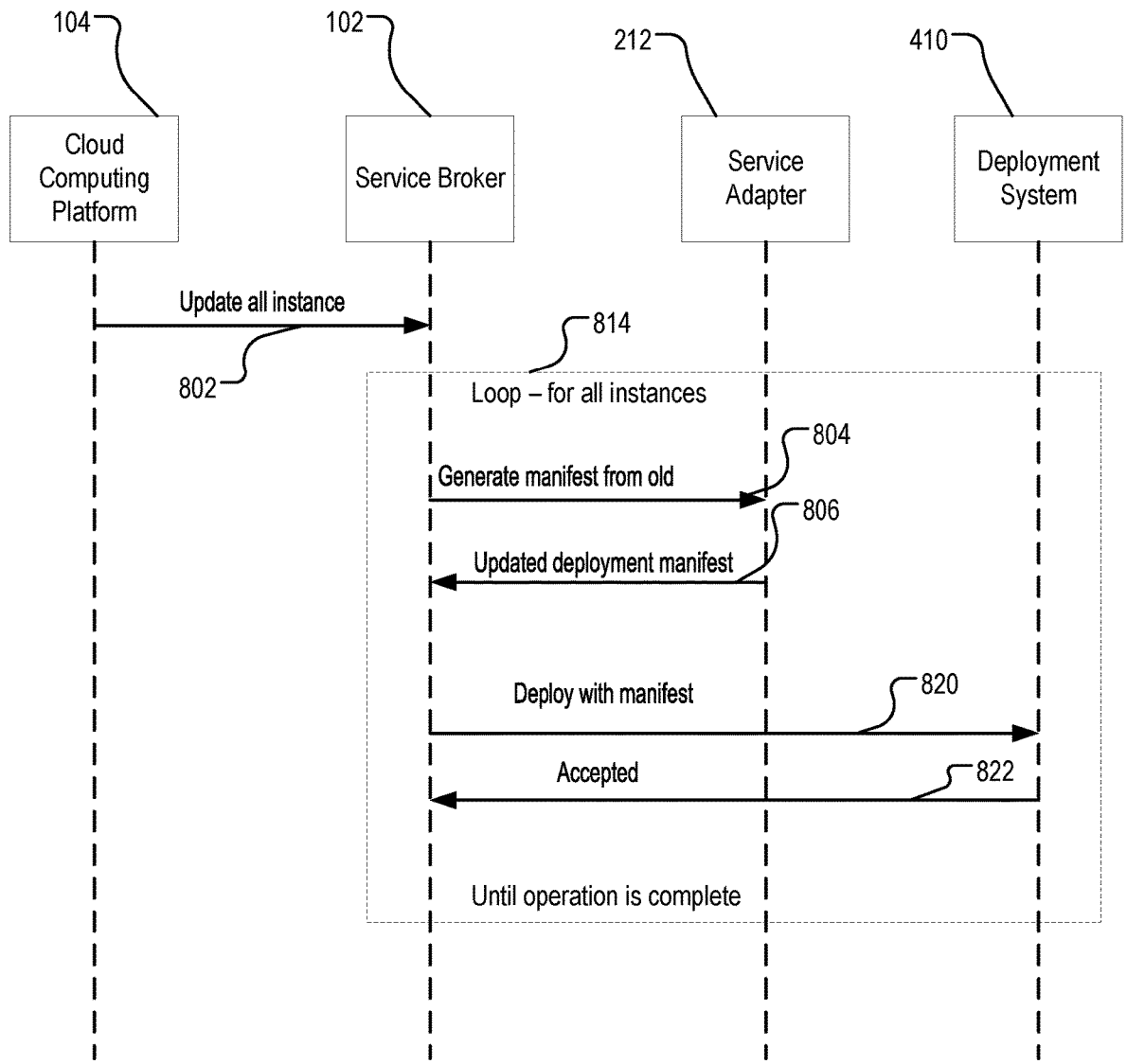
FIG. 8 is sequence diagram illustrating example operations of updating multiple service instances.

FIG. 8 is sequence diagram illustrating example operations of updating multiple service instances. An advantage of the disclosed techniques over conventional deployment technology is the ability to automatically update multiple service instances when a service plan changes. For example, a "medium" service plan, which previously provisioned X amount of resources can be modified to provision Y amount of resources now. The modification can trigger an update where a cloud computing platform 104 updates all service instances based on the "medium" service plan.

The cloud computing platform 104 issues an update multiple instances request 802 to a service broker 102. The cloud computing platform 104 can issue the update multiple instances request 802 in response to a request from a user device, or in response to a plan change, for example, when resources designated for a plan labelled "medium" increase according to a changed plan definition. The cloud computing platform 104 then updates all service instances that implement the changed plan definition.

In response to receiving the update multiple instances request 802, the service broker 102 enters a loop 814 for all service instances created or managed by the service broker 102. In each iteration of the loop 814, the service broker 102 submits a generate new deployment manifest request 804 to the service adapter 212. The generate new deployment manifest request 804 can indicate a previous deployment manifest. In response to the new deployment manifest request 804, the service adapter 212 generates an updated deployment manifest 806. Generating the updated deployment manifest 806 can be based on the updated plan, e.g., by increasing or decreasing amount of resources provisioned, changing types of resources provided, or both. The service adapter 212 provides the updated deployment manifest 806 to the service broker 102.

In response to receiving the updated deployment manifest 806 from the service adapter 212, the service broker submits a deployment request 820 to a deployment system 410. The deployment request 820 can include, or be associated with, the updated deployment manifest 806. In response to the deployment request 820, the deployment system 410 provisions new resources for a service instance, and sends a notification 822 indicating that the deployment system 410 accepted the deployment request 820 and is provisioning the new resources for the service instance. The loop 814 can continue until all services instances are re-provisioned. The service broker can loop through the service instances synchronously, e.g., by iterating through a next service instances upon receiving the notification 822, or asynchronously, e.g., by sending the generate new deployment manifest request 804 to the service adapter 212 in batch.

Figure 9:
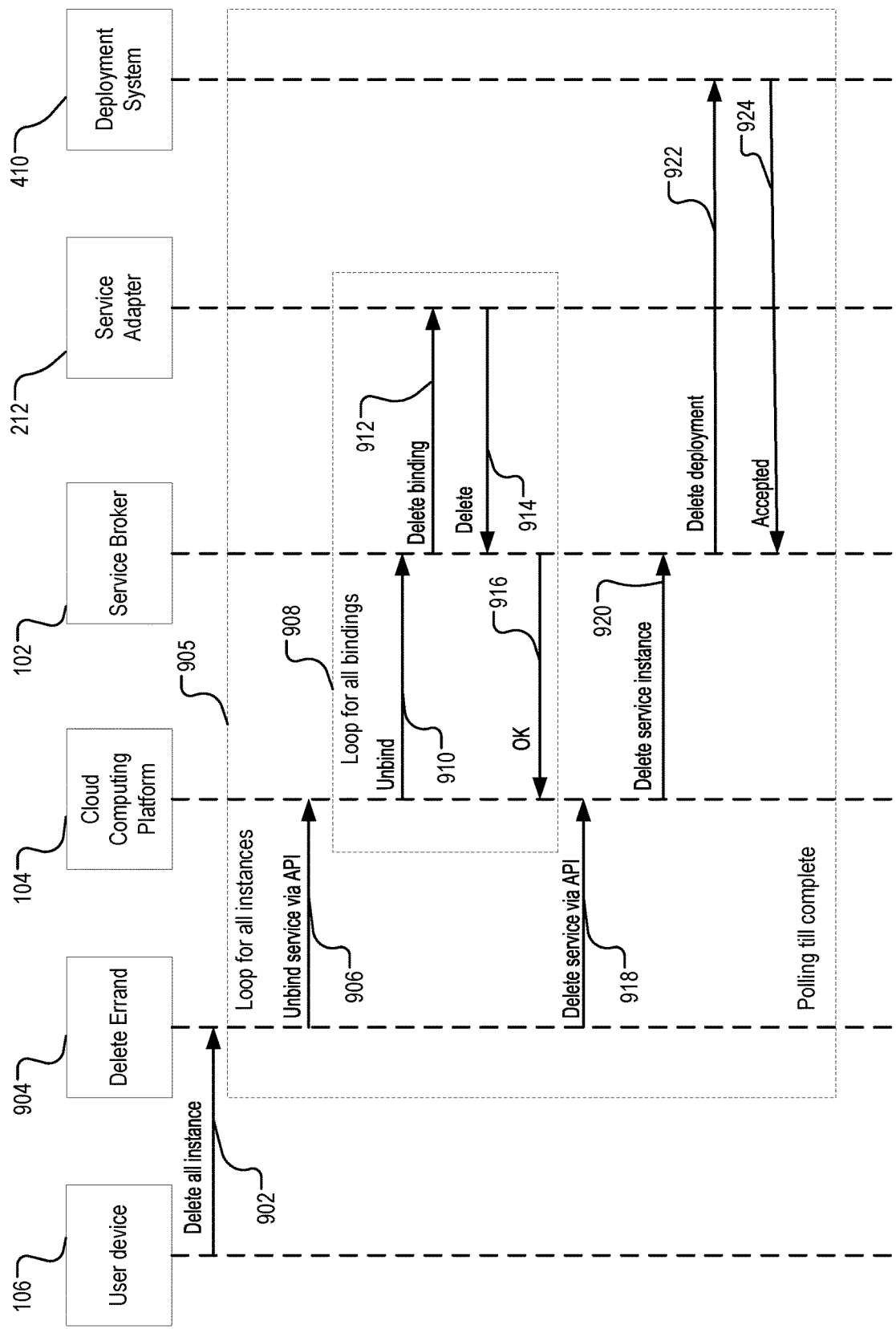
FIG. 9 is sequence diagram illustrating example operations of deleting multiple service instances.

FIG. 9 is sequence diagram illustrating example operations of deleting multiple service instances. A user device 106 issues a delete all service instances request 902. A delete instances errand 904 receives the all service instances request 902. The delete instances errand 904 can be a script, or binary program, that executes at the beginning, the end, or both, of a service instance's availability time. The delete instances errand 904 is a component of the broker errands functional module 208 of FIG. 2.

In response to receiving the delete all service instances request 902, the delete instances errand 904 enters a loop 905 that unbinds service instances and deletes the service instances in multiple operations. In each operation, the delete instances errand 904 submits an unbind service request 906 according to a cloud computing platform API. A cloud computing platform 104 receives the unbind service request 906 according to the API. In response, the cloud computing platform 104 enters a loop 908 that iterates through all bindings of the service instance.

In each iteration, the cloud computing platform 104 issues an unbind request 910 for a respective binding to a service broker 102. In response to receiving the unbind request 910, the service broker 102 submits a delete binding request 912 to a service adapter 212. Responsive to the delete binding request 912, the service adapter 212 deletes the binding in the current iteration, and provides a binding deletion notification 914 to the service broker 102. Upon receiving the binding deletion notification 914, the service broker 102 submits an acknowledgement 916 to the cloud computing platform 104. The cloud computing platform 104 can loop through the bindings synchronously, e.g., by iterating through a next service instance upon receiving the acknowledgement 916, or asynchronously, e.g., by sending the unbind request 910 in batch.

In the loop 905, the delete instances errand 904 can iteratively delete each service instance. In each iteration, the delete instances errand 904 can submit a delete service request 918 to the cloud computing perform 104 according to an API. In response to receiving the delete service request 918, the cloud computing platform 104 submits a delete service instance request 920 to the service broker 102. The service broker 102, in turn, submits a delete deployment request 922 to a deployment system 410. Responsive to the delete deployment request 922, the deployment system 410 deletes the service instance, and provides a deletion accepted status 924 to the service broker 102. The delete instances errand 904 can loop through the service instances synchronously or asynchronously.

Figure 10:
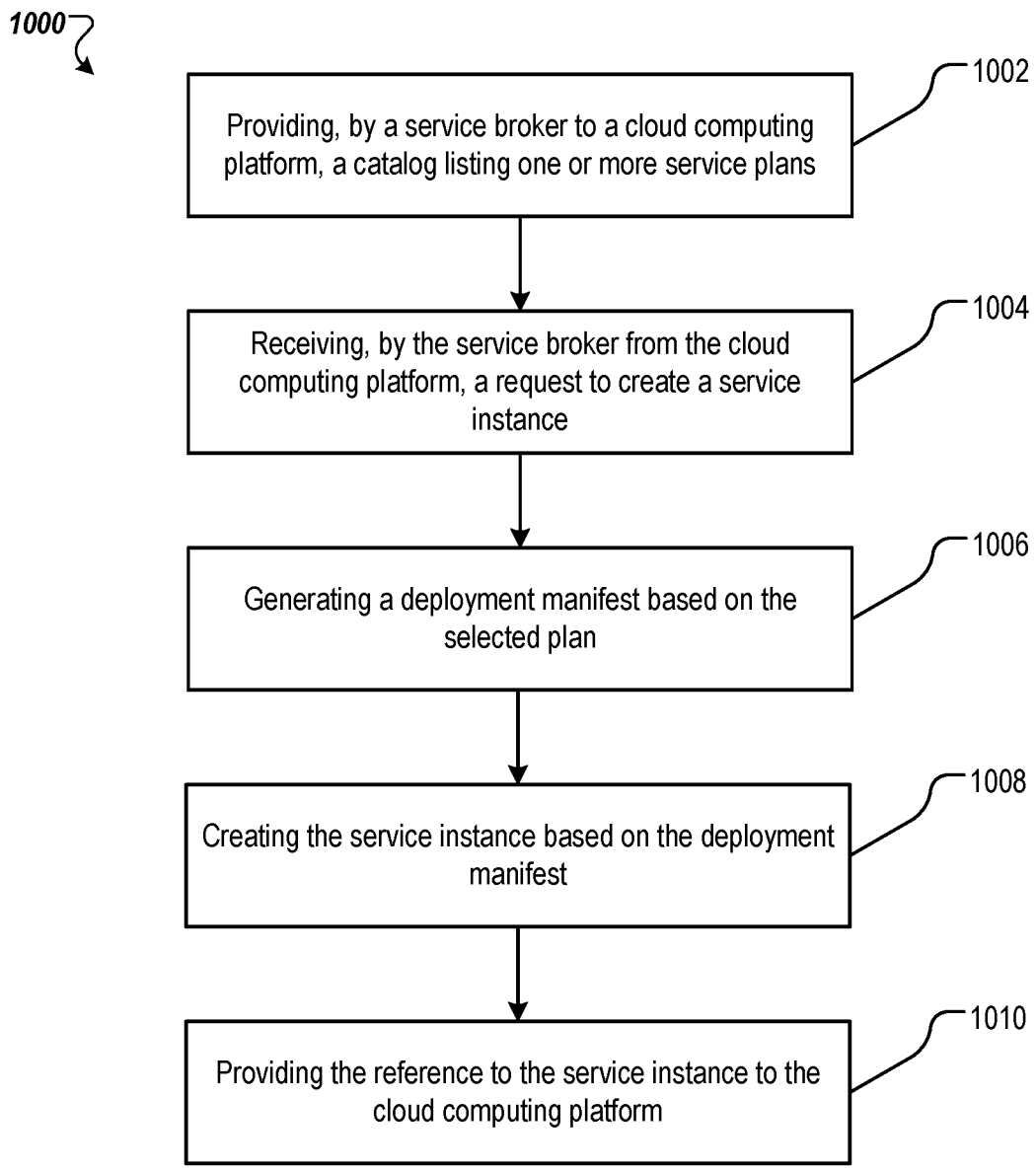
FIG. 10 is a flowchart illustrating an example process of on-demand resource provisioning.

FIG. 10 is a flowchart illustrating an example process 1000 of on-demand resource provisioning. The process 1000 can be performed by a system including one or more computers, e.g., the system 100 of FIG. 1.

An on-demand service broker, e.g., the service broker 102 of FIG. 1, provides (1002) to a cloud computing platform, e.g., the cloud computing platform 104 of FIG. 1, a catalog. The catalog listing one or more service plans, each service plan corresponding to a respective set of resources. In some implementations, each service plan specifies a virtual machine type and a quota amount, e.g., number of disks, for the corresponding set of resources.

Providing the catalog can be in response to a register service broker request. The register service broker request specifies parameters for accessing the service broker. The parameters for accessing a service broker can include, for example, a link to the service broker and credentials for accessing the service broker. The service broker can be configured according to a service broker manifest. The service broker manifest can specify the credentials for accessing the service broker; a first reference (e.g., a first URI) to an interface through which the service broker communicates with the cloud computing platform to receive the request and provides the catalog; and a second reference (e.g., a second URI) to an interface through which the service broker communicates with the deployment system. The system can create and deploy the service broker ahead of time.

The service broker receives (1004), from the cloud computing platform, a request to create a service instance, the request specifying a service plan selected from the catalog. The request can originate from a user device.

The service broker generates (1006) a deployment manifest based on the selected plan. The deployment manifest specifies parameters of the set of resources of the selected plan in the deployment manifest. Generating the deployment manifest can include invoking, by the service broker, a service adapter. The service broker can then cause the service adapter to generate the deployment manifest.

The system creates (1008) a service instance. Creating the service instance includes providing the deployment manifest by the service broker to a deployment system and receiving a reference to the service instance by the service broker from the deployment system. Creating the service instance can include creating one or more virtual machines in which an application executes and configuring the one or more virtual machines according to the parameters specified in the deployment manifest. The application can be a consumer application that consumes resources and performs user functions. The consumer application can be an application provided by a user. An example consumer application is a cloud-based inventory management application. The application can be a service application that provides resources to consumer applications. The service application can be an application provided by the system. An example service application is a database application, e.g., MySQL.

The system can bind the set of resources to the service instance. For example, the service broker receives, from the cloud computing platform, a request to bind resources to the service instance. The service broker creates binding information. The binding information includes references to the resources and credentials for accessing the resources. The service broker then provides the binding information to the cloud computing platform as a response to the request to bind resources. In some implementations, creating the binding information can include invoking, by the service broker, a service adapter. The service broker can then cause the service adapter to generate the binding information.

The system provides (1010) the reference to the service instance to the cloud computing platform as a response to the request.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communications network. Examples of communications networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, the subject matter is described in context of scientific papers. The subject matter can apply to other indexed work that adds depth aspect to a search. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A computer-implemented method for performing on-demand service provisioning, the method comprising:
   receiving, by an on-demand service broker, a request to deploy a newly provisioned service instance for a service, wherein a service instance comprises a configured computing environment on a cloud computing platform for implementing the service;
   in response to receiving the request to deploy the newly provisioned service instance, providing, by the on-demand service broker to a service adapter deployed on the cloud computing platform by a developer of the service, a request to generate a deployment manifest to provision resources for the service instance;
   in response to receiving the request from the on-demand service broker to generate a deployment manifest to provision resources for the service instance, generating, by the service adapter deployed by the developer of the service, a deployment manifest for provisioning resources for the service instance; and
   providing the deployment manifest by the on-demand service broker to a deployment system to cause the deployment system to provision resources for the service instance specified by the deployment manifest and to deploy the service using the resources provisioned for the service instance.

2. The method of claim 1, further comprising:
   receiving a reference to the service instance by the on-demand service broker from the deployment system; and
   providing the reference to the service instance to the cloud computing platform as a response to the request to deploy the service instance.

3. The method of claim 1, further comprising:
   receiving, by the on-demand service broker from the cloud computing platform, a request to bind resources to the service instance;
   creating binding information, the binding information including references to the resources and credentials for accessing the resources; and
   providing the binding information to the cloud computing platform as a response to the request to bind resources.

4. The method of claim 3, wherein providing the binding information comprising providing references and credentials for accessing the resources provisioned for the service instance to a resource consumer.

5. The method of claim 3, wherein providing the binding information to the cloud computing platform comprises binding the service to an application deployed on the cloud computing platform.

6. The method of claim 3, wherein creating the binding information comprises:
   invoking, by the on-demand service broker, the service adapter; and
   causing the service adapter to generate the binding information.

7. The method of claim 1, wherein provisioning resources for the service instance comprises provisioning one or more virtual machines in which the service instance executes and configuring the one or more virtual machines according to the parameters in the deployment manifest generated by the service adapter.

8. The method of claim 1, wherein provisioning resources for the service instance specified by the deployment manifest comprising provisioning the resources without requiring action by an operator of the platform.

9. A system comprising:
   one or more computers and one or more storage devices storing instructions that are operable, when executed by the one or more computers, to cause the one or more computers to perform operations comprising:
   receiving, by an on-demand service broker, a request to deploy a newly provisioned service instance for a service, wherein a service instance comprises a configured computing environment on a cloud computing platform for implementing the service;
   in response to receiving the request to deploy the newly provisioned service instance, providing, by the on-demand service broker to a service adapter deployed on the cloud computing platform by a developer of the service, a request to generate a deployment manifest to provision resources for the service instance;
   in response to receiving the request from the on-demand service broker to generate a deployment manifest to provision resources for the service instance, generating, by the service adapter deployed by the developer of the service, a deployment manifest for provisioning resources for the service instance; and
   providing the deployment manifest by the on-demand service broker to a deployment system to cause the deployment system to provision resources for the service instance specified by the deployment manifest and to deploy the service using the resources provisioned for the service instance.

10. The system of claim 9, wherein the operations further comprise:
    receiving a reference to the service instance by the on-demand service broker from the deployment system; and
    providing the reference to the service instance to the cloud computing platform as a response to the request to deploy the service instance.

11. The system of claim 9, wherein the operations further comprise:
    receiving, by the on-demand service broker from the cloud computing platform, a request to bind resources to the service instance;
    creating binding information, the binding information including references to the resources and credentials for accessing the resources; and
    providing the binding information to the cloud computing platform as a response to the request to bind resources.

12. The system of claim 11, wherein providing the binding information comprising providing references and credentials for accessing the resources provisioned for the service instance to a resource consumer.

13. The system of claim 11, wherein providing the binding information to the cloud computing platform comprises binding the service to an application deployed on the cloud computing platform.

14. The system of claim 11, wherein creating the binding information comprises:
    invoking, by the on-demand service broker, the service adapter; and causing the service adapter to generate the binding information.

15. The system of claim 9, wherein provisioning resources for the service instance comprises provisioning one or more virtual machines in which the service instance executes and configuring the one or more virtual machines according to the parameters in the deployment manifest generated by the service adapter.

16. The system of claim 9, wherein provisioning resources for the service instance specified by the deployment manifest comprising provisioning the resources without requiring action by an operator of the platform.

17. One or more non-transitory computer storage media encoded with computer program instructions that when executed by one or more computers cause the one or more computers to perform operations comprising:
    receiving, by an on-demand service broker, a request to deploy a newly provisioned service instance for a service, wherein a service instance comprises a configured computing environment on a cloud computing platform for implementing the service;
    in response to receiving the request to deploy the newly provisioned service instance, providing, by the on-demand service broker to a service adapter deployed on the cloud computing platform by a developer of the service, a request to generate a deployment manifest to provision resources for the service instance;
    in response to receiving the request from the on-demand service broker to generate a deployment manifest to provision resources for the service instance, generating, by the service adapter deployed by the developer of the service, a deployment manifest for provisioning resources for the service instance; and
    providing the deployment manifest by the on-demand service broker to a deployment system to cause the deployment system to provision resources for the service instance specified by the deployment manifest and to deploy the service using the resources provisioned for the service instance.

18. The one or more computer storage media of claim 17, wherein the operations further comprise:
    receiving a reference to the service instance by the on-demand service broker from the deployment system; and
    providing the reference to the service instance to the cloud computing platform as a response to the request to deploy the service instance.

19. The one or more computer storage media of claim 17, wherein the operations further comprise:
    receiving, by the on-demand service broker from the cloud computing platform, a request to bind resources to the service instance;
    creating binding information, the binding information including references to the resources and credentials for accessing the resources; and
    providing the binding information to the cloud computing platform as a response to the request to bind resources.

20. The one or more computer storage media of claim 19, wherein providing the binding information comprising providing references and credentials for accessing the resources provisioned for the service instance to a resource consumer.

* * * * *